(12) United States Patent
Kohli et al.

(10) Patent No.: US 8,605,992 B2
(45) Date of Patent: Dec. 10, 2013

(54) IMAGE COMPLETION USING SCENE GEOMETRY

(75) Inventors: Pushmeet Kohli, Cambridge (GB); Toby Sharp, Cambridge (GB); Carsten Curt Eckard Rother, Cambridge (GB)

(73) Assignee: Microsoft Corporation, Redmond, WA (US)

(*) Notice: Subject to any disclaimer, the term of this patent is extended or adjusted under 35 U.S.C. 154(b) by 321 days.

(21) Appl. No.: 13/083,271

(22) Filed: Apr. 8, 2011

(65) Prior Publication Data

US 2012/0257814 A1    Oct. 11, 2012

(51) Int. Cl.
*G06K 9/00* (2006.01)
*G06K 9/40* (2006.01)
*G06T 15/00* (2011.01)
*G06T 15/40* (2011.01)
*H04N 5/89* (2006.01)

(52) U.S. Cl.
USPC ........... 382/154; 382/254; 382/260; 345/419; 345/421; 348/40

(58) Field of Classification Search
USPC ............... 382/154, 199, 256, 266, 276, 294; 345/419, 421, 422, E13.002; 348/43, 348/51, 42, E13.064, E13.068; 702/166; 715/781
See application file for complete search history.

(56) References Cited

U.S. PATENT DOCUMENTS

| | | | |
|---|---|---|---|
| 6,987,520 B2 * | 1/2006 | Criminisi et al. | 345/629 |
| 7,755,645 B2 | 7/2010 | Sun et al. | |
| 8,218,893 B2 * | 7/2012 | Lim et al. | 382/266 |
| 2008/0112626 A1 | 5/2008 | Sun et al. | |
| 2008/0199083 A1 * | 8/2008 | Chen et al. | 382/203 |
| 2008/0238942 A1 | 10/2008 | Sun et al. | |
| 2009/0190852 A1 | 7/2009 | Lim et al. | |
| 2009/0310828 A1 | 12/2009 | Kakadiaris et al. | |
| 2012/0001902 A1 * | 1/2012 | Lee et al. | 345/419 |
| 2012/0113093 A1 * | 5/2012 | Liao et al. | 345/419 |
| 2012/0162193 A1 * | 6/2012 | Bae et al. | 345/419 |
| 2012/0162395 A1 * | 6/2012 | Ho et al. | 348/51 |

OTHER PUBLICATIONS

Hervieu, et al Stereoscopic image inpainting: distinct depth maps and images inpainting, 2010 International Conference on Pattern Recognition.*
Zigelman, G.; Kimmel, R.; Kiryati, N., "Texture mapping using surface flattening via multidimensional scaling," Visualization and Computer Graphics, IEEE Transactions on , vol. 8, No. 2, pp. 198,207, Apr.-Jun. 2002.*

(Continued)

*Primary Examiner* — Andrae S Allison
(74) *Attorney, Agent, or Firm* — Zete Law, P.L.L.C.; MacLane C. Key (57) ABSTRACT

Image completion using scene geometry is described, for example, to remove marks from digital photographs or complete regions which are blank due to editing. In an embodiment an image depicting, from a viewpoint, a scene of textured objects has regions to be completed. In an example, geometry of the scene is estimated from a depth map and the geometry used to warp the image so that at least some surfaces depicted in the image are fronto-parallel to the viewpoint. An image completion process is guided using distortion applied during the warping. For example, patches used to fill the regions are selected on the basis of distortion introduced by the warping. In examples where the scene comprises regions having only planar surfaces the warping process comprises rotating the image. Where the scene comprises non-planar surfaces, geodesic distances between image elements may be scaled to flatten the non-planar surfaces.

18 Claims, 8 Drawing Sheets

(56) References Cited

OTHER PUBLICATIONS

Rangarajan et al, Image Inpainting using Two-View Epipolar Geometry, http://ebookbrowse.com/techsummary-image-inpainting-using-two-view-epipolar-geometry-pdf-d64924059, Feb. 2011.*

Darko Pavić et al, Interactive image completion with perspective correction, The Visual Computer Sep. 2006, vol. 22, Issue 9-11, pp. 671-681.*

Xiao, et al., "Image-based Facade Modeling", Retrieved at << http://www.cse.ust.hk/~quan/publications/ xiao-facade-siggraphasia08.pdf >>, ACM Transaction on Graphics (TOG), Proceedings of SIGGRAPHAsia, 2008, pp. 10.

Liu, et al., "Image De-fencing", Retrieved at << http://www.cse.psu.edu/~lubliner/papers/DF.pdf >>, IEEE Computer Society Conference on Computer Vision and Pattern Recognition (CVPR), Jun. 24-26, 2008, pp. 8.

Liu, et al., "Edge-Based Inpainting and Texture Synthesis for Image Compression", Retrieved at << http://research.microsoft.com/en-us/people/fengwu/inpainting_icme_07.pdf >>, IEEE International Conference on Multimedia and Expo, Jul. 2-5, 2007, pp. 4.

Pereira, et al., "Symmetry-Based Completion", Retrieved at << http:// w3.impa.br/~tpereira/ symmetrycompletion/symmetrybased_completion.pdf >>, 4th International Conference on Computer Graphics Theory and Applications, 2009, pp. 6.

Pavic, et al., "Interactive image completion with perspective correction", Retrieved at << http://citeseerx.ist.psu.edu/viewdoc/download?doi=10.1.1.84.1074&rep=rep1&type=pdf >>, SIGGRAPH, 2006, pp. 11.

Fang, et al., "Textureshop: texture synthesis as a photograph editing tool", Retrieved at << http://graphics.cs.uiuc.edu/~jch/papers/textureshop.pdf >>, ACM Transactions on Graphics, vol. 23, 2004, pp. 6.

* cited by examiner

IMAGE COMPLETION USING SCENE GEOMETRY

BACKGROUND

Image completion is used in many situations such as to edit digital photographs, to improve the quality of medical images, satellite images, images from security cameras and other types of images including image sequences. For example, a tear or stain on a photograph may be digitally repaired using image completion. In another example, an object in a foreground of a digital image may have been removed and the resulting hole is then completed.

Many existing approaches to image completion are manual and involve a user copying and pasting backgrounds to fill holes in a digital image. This is time consuming, error prone and complex.

There is an ongoing need to improve the quality of results of automated approaches whilst enabling image completion to be achieved in practical time scales in a cost effective manner.

The embodiments described below are not limited to implementations which solve any or all of the disadvantages of known image completion systems.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present a selection of concepts disclosed herein in a simplified form as a prelude to the more detailed description that is presented later.

Image completion using scene geometry is described, for example, to remove marks from digital photographs or complete regions which are blank due to editing. In an embodiment an image depicting, from a viewpoint, a scene of textured objects has regions to be completed. In an example, geometry of the scene is estimated from a depth map and the geometry used to warp the image so that at least some surfaces depicted in the image are fronto-parallel to the viewpoint. An image completion process is guided using distortion applied during the warping. For example, patches used to fill the regions are selected on the basis of distortion introduced by the warping. In examples where the scene comprises regions having only planar surfaces the warping process comprises rotating the image. Where the scene comprises non-planar surfaces, geodesic distances between image elements may be scaled to flatten the non-planar surfaces.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in an image completion system used with digital photographs and videos, the system described is provided as an example and not a limitation. As those skilled in the art will appreciate, the present examples are suitable for application in a variety of image completion systems for images of different types.

Figure 1:
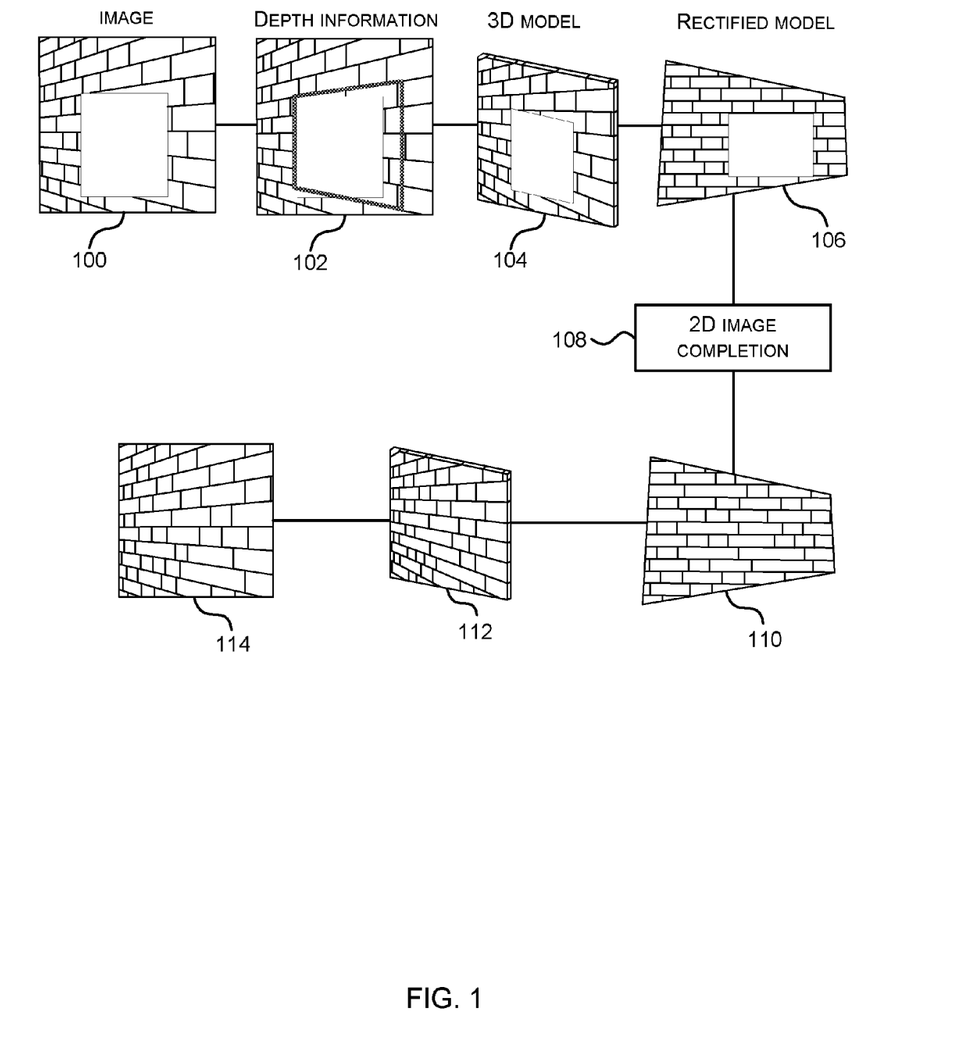
FIG. 1 is a flow diagram of an image completion process using scene geometry.

FIG. 1 is a flow diagram of a method of image completion using scene geometry. An image 100 to be completed is received. This image may be a digital photograph, an image from a video sequence, a medical image, or any other type of digital image which represents texture of surfaces in a scene. Depth information 102 is obtained. This depth information corresponds to depths of surfaces depicted in the image 100. The depth information may be obtained from any source. For example, it may be calculated from the image 100 using shape from shading techniques. It may be obtained from user input for example, by receiving user input specifying a horizon line in the image 100 and/or points on a plane in the image 100. In another example, the depth information is provided as a depth map from a depth camera. In another example, the depth information is obtained from stereo information where the image 100 is one of a stereo pair obtained from a stereo camera or stereo video camera.

A region in the image 100 is missing and depth information for that region is also absent. The task of the image completion process is to complete all or part of the missing region (also referred to herein as the destination region). Note that the missing region need not be contiguous; that is, there may be more than one area or patch in the image that is to be completed.

Scene geometry is estimated using the depth information 102. For example, a 3D model 104 comprises an estimate of the scene geometry which may comprise sizes and positions of planes in the scene and sizes, positions and nature of any non-planar surfaces in the scene. In an example, the 3D model comprises a depth map specifying surfaces of objects in the scene. In another example the 3D model comprises a mesh recovered from the image using shape from shading techniques.

Using the scene geometry the image 100 is warped or rectified. For example, the image may be warped so that at least some surfaces depicted in the image appear fronto-parallel to a view point of a camera (which may be notional, for example where the image is artificially generated rather than captured by a camera) used to capture the image 100. The warped image 106 is then passed to an image completion process which carries out a two dimensional image completion process 108. The completed image 110 has the missing region filled in as indicated in FIG. 1. The completed image may be warped back to agree with the scene geometry 112 to give an output image 114 which is completed.

In summary, an image having at least one region to be completed is received at a computing device. Geometry of a scene depicted in the image is estimated by the computing device which then warps the image using the estimated geometry. The warping may be applied so that one or more surfaces depicted in the image are approximately fronto-parallel to a view point of a capture device used to capture the image. Source image patches are selected (for example, from the received image itself, from a dictionary of patches, from other images in a sequence of which the received image is a member, or from other images) in a way which takes into account the distortion introduced by the warping process. The source image patches are used to fill the region to be completed. In this way the resulting completed image is of high quality. Scenes depicting textured surfaces which recede into the distance may be completed with high accuracy. Scenes depicting non-planar textured surfaces may also be completed with high accuracy. Errors caused by repeated interpolation effects are reduced.

Figure 2:
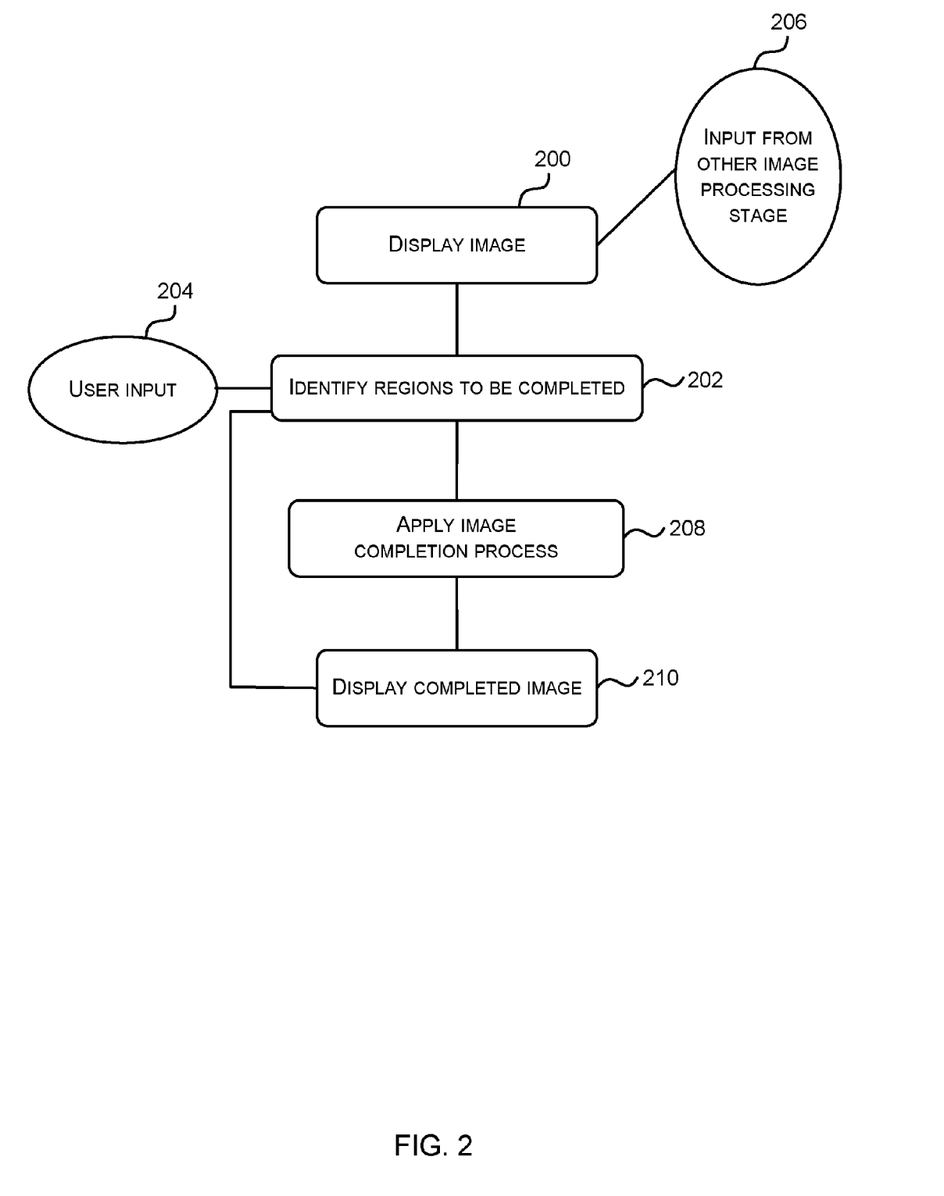
FIG. 2 is a flow diagram of an iterative process of image completion.

FIG. 2 is a flow diagram of an image completion process. An image is displayed 200 at a display device and regions in that image which are to be completed are identified 202. For example, the regions may be identified using user input 204, input from other image processing stages 206 or using an automated procedure. For example, an image may depict foreground objects which are selected by user input 204 for deletion. After removing these objects from the foreground blank regions or holes remain in the image. An image completion process 208 is applied as described in more detail below and the resulting completed image displayed 210. The image completion process may then repeat as indicated in FIG. 2 (for example, as requested by a user) to refine and extend the image completion as required.

Figure 3:
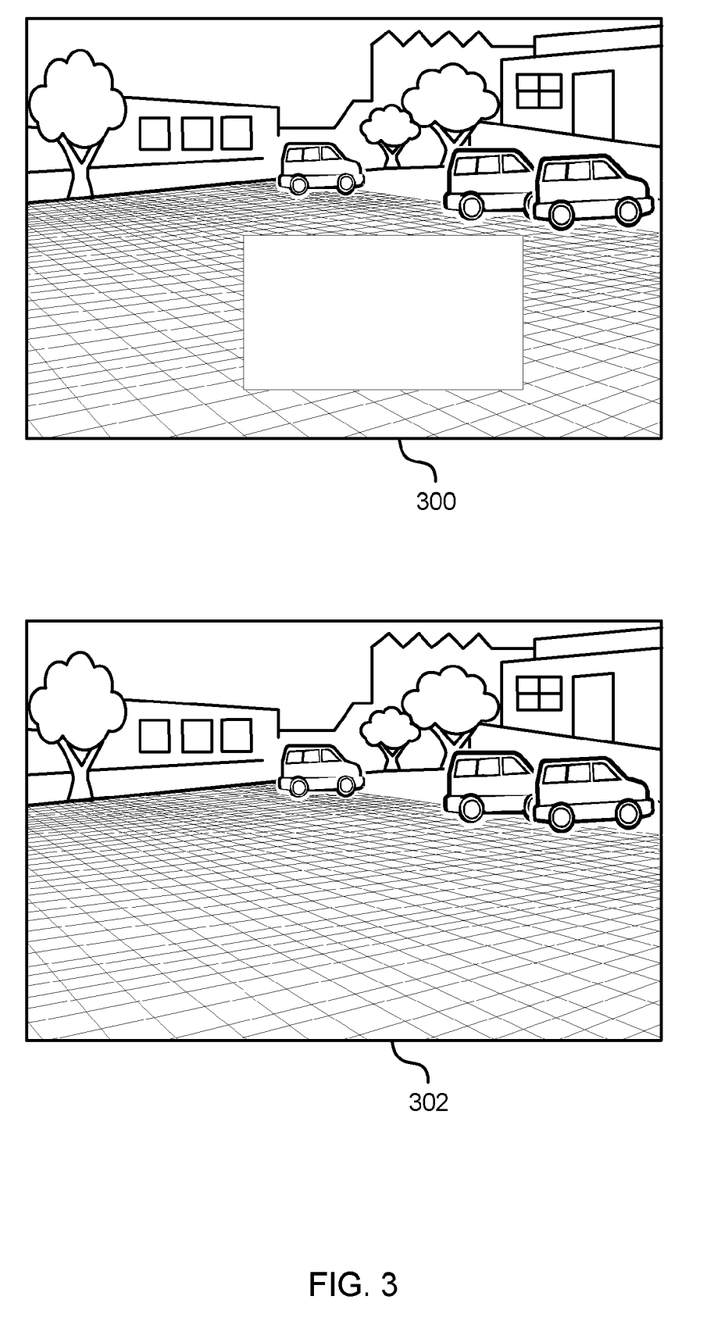
FIG. 3 is a schematic diagram of a digital photograph before and after image completion using scene geometry.

FIG. 3 shows two schematic images 300, 302. Schematic image 300 depicts a forecourt of a group of buildings where three cars are parked. The forecourt has a tiled surface which recedes into the distance. Part of the tiled surface in the foreground of the schematic image is missing as indicated by the blank rectangular region. After applying an image completion process as described herein the blank region is completed as indicated in schematic image 302. Many previous image completion processes have been unable to give high quality results in situations where images depict textured planar surfaces which recede into the distance in this manner.

Figure 4:
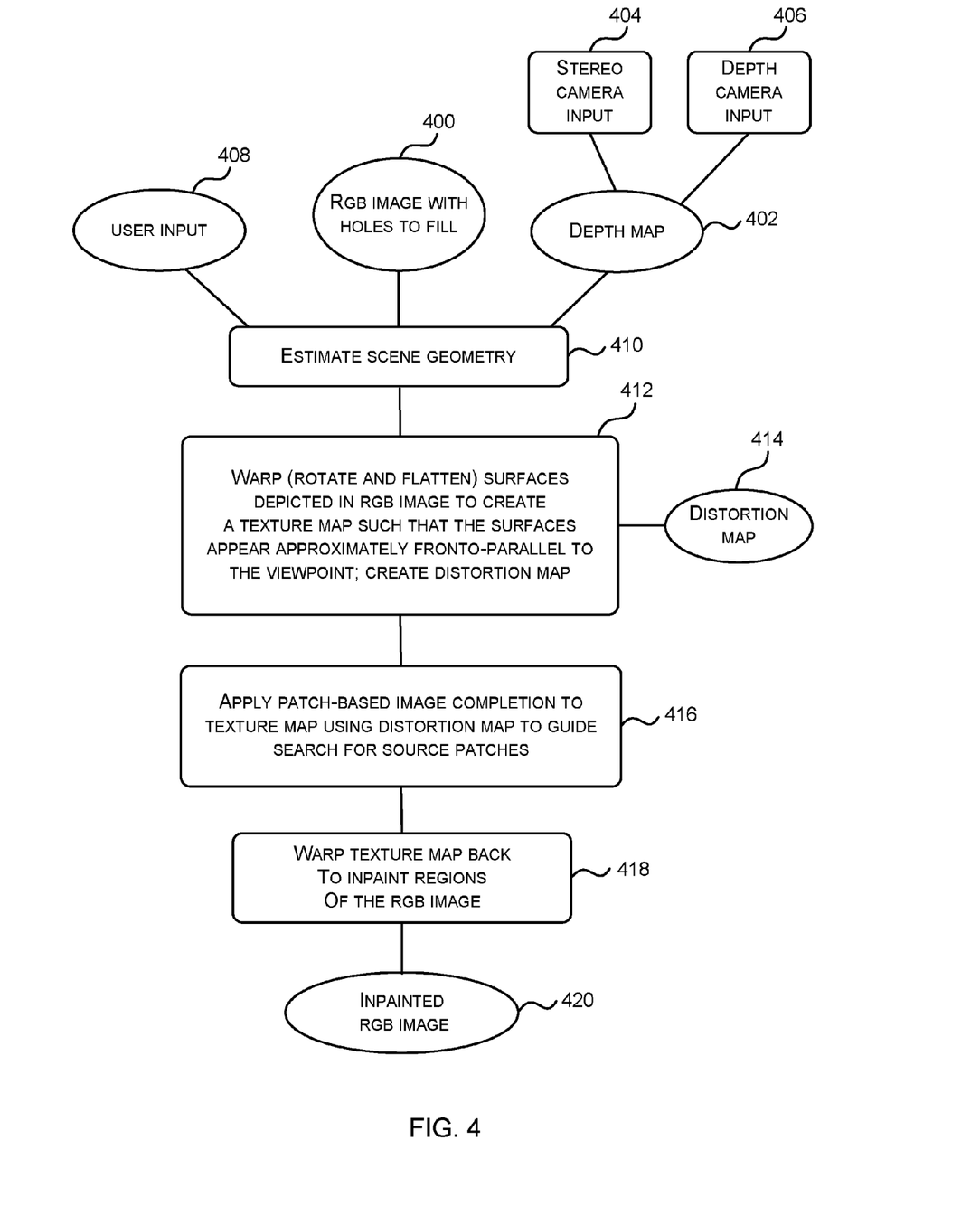
FIG. 4 is a flow diagram of a method of warping an image before and after image completion.

FIG. 4 is a flow diagram of an example method of image completion. An image 400 with at least one region to be completed is received. This image depicts a scene with texture and may be a color image (red green blue (RGB) image from a color video camera), or any of the other types of image mentioned above with reference to FIG. 1. A depth map 402 of the scene is also available. For example, the depth map may be from stereo camera input 404 or from depth camera input 406. Any suitable type of depth camera may be used.

Each depth map 402 comprises a two dimensional image in which each image element comprises a depth value such as a length or distance from the camera to an object in the captured scene which gave rise to that image element. This depth value may be an absolute value provided in specified units of measurement such as meters, or centimeters or may be a relative depth value. In some cases the depth value may be a disparity value such as in situations where stereo depth information is available. In each captured depth image there may be around 300,000 or more image elements each having a depth value. The frame rate may be high enough to enable the depth images to be used for working robotics, computer game or other applications. For example, at least 20 frames per second.

The depth information may be obtained using any suitable technique including but not limited to, time of flight, structured light, stereo images. In some examples the depth camera is able to organize the depth information into Z layers that are perpendicular to a Z axis extending along a line of sight of the depth camera.

The image completion system estimates the geometry of the scene depicted in the image to be completed. For example, this comprises identifying surfaces of one or more objects depicted in the image. The depth map may be used to identify the surfaces. Other sources of information for estimating the scene geometry include user input and the RGB image itself. Any combinations of one or more of these sources of information may be used to estimate the scene geometry.

In some examples the geometry of the scene depicted in the RGB image 400 and the depth map 402 is estimated from the depth map. For example, the depth information may be organized into Z layers as mentioned above. These layers may be examined to identify any planes depicted in the scene. Geometry of any identified planes may be determined to enable a compact representation of the planes to be obtained. Curved surfaces may also be identified and represented geometrically.

The image completion system warps 412 (for example, rotates and flattens) the surfaces depicted in the RGB image 400 to create a texture map such that the surfaces appear approximately fronto-parallel to the viewpoint of a camera (which may be a notional camera) used to capture the image. The distortion applied to the RGB image 400 in this warping process may be stored in a distortion map 414. For example, a distortion map is a data structure for storing a value corresponding to each image element of the RGB image. The value is related to an amount of distortion applied to the corresponding image element by the warping. An image element may be a pixel or a group of two or more pixels such as a patch, blob or region.

In some examples the warping comprises flattening surfaces depicted in the RGB image. This may be achieved by scaling geodesic distances computed between pairs of image elements and this is described in more detail with reference to FIG. 5 below. The warping may also comprise rotating one or more surfaces depicted in the RGB image. In some examples the warping comprises carrying out perspective correction of the image using the estimated scene geometry to remove perspective effects from the RGB image. In some cases the warping comprises only rotating one or more surfaces depicted in the RGB image as described below with reference to FIG. 6.

The warped image may be referred to as a texture map. A patch-based image completion process is applied to the texture map using the distortion map to guide 416 the search for patches. This is described in more detail below with reference to FIG. 7. The completed texture map may be warped back 418 (reversing the original warping process of 412). This gives a completed image 420 also referred to as an inpainted image.

Figure 5:
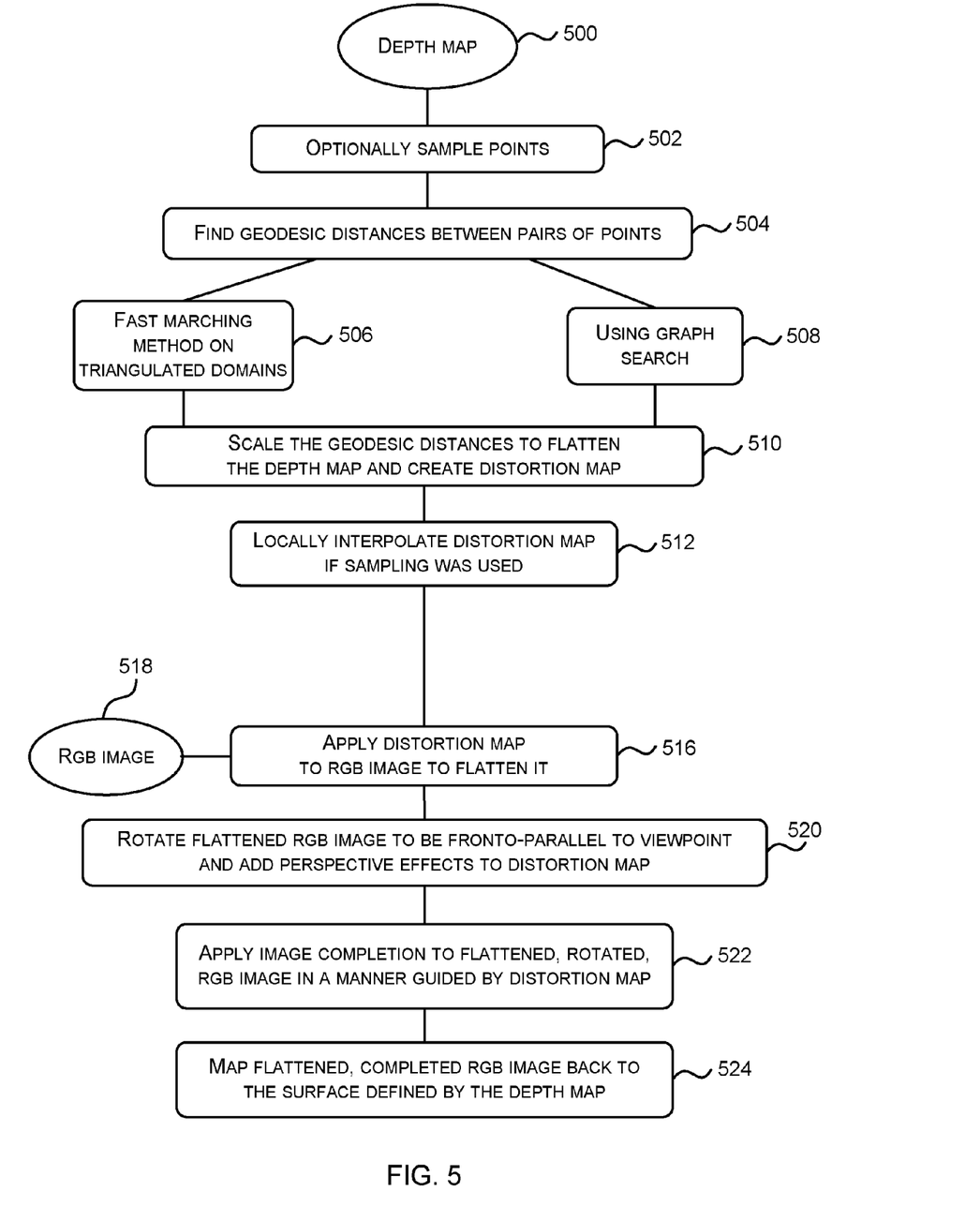
FIG. 5 is a flow diagram of a method of flattening and rotating an image before image completion.
Figure 6:
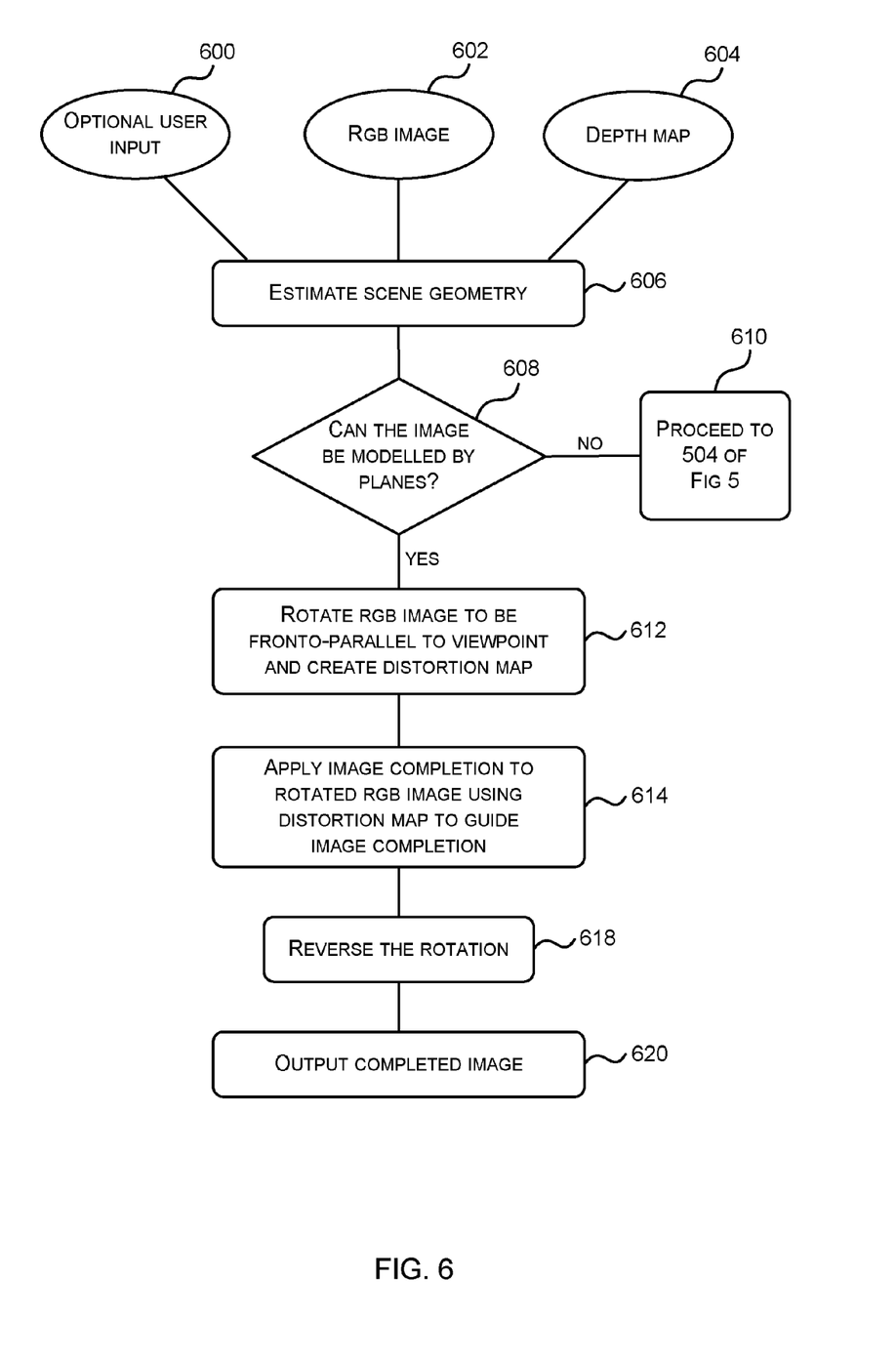
FIG. 6 is a flow diagram of a method of image completion in the case that the scene geometry is approximately planar.

FIG. 5 is a flow diagram of another example method of image completion where geodesic distances are scaled to flatten the surfaces depicted in the RGB image. A depth map 500 is received as described above. Points from the depth map may optionally be sampled 502 for example, by taking a grid of points from the depth map or in other ways. Geodesic distances (for example, geodesic shortest path distances) are computed 504 between pairs of points from the depth map. Where sampling is used the geodesic distances are computed between pairs of the sampled points. A geodesic distance between two points in a depth map is a distance which takes into account depth gradients. For example, consider the values of the image elements of the depth map as a point cloud. The shortest geodesic distance between two points in the depth map may then be one that travels around a region of high depth rather than a Euclidean shortest path which travels "as the crow flies". Any suitable method for computing the geodesic distances may be used. For example, using graph search 508 and length estimators. Another example is to use a fast marching method on triangulated domains 506.

The geodesic distances may be scaled 510 to flatten the depth map. A distortion map may be created and stored to hold values for each image element representing an amount of distortion applied to that image element by the flattening. If sampling was used the distortion map may be locally interpolated 512 to complete any gaps between sampled points.

The distortion map may be applied to an RGB image 518 (or other texture image) depicting the same scene as the depth map 500. For example, the RGB image is distorted using the values stored in the distortion map. At least some of the surfaces depicted in the RGB image 518 are now flattened. For example, the RGB image may depict a person's face and after flattening the profile of the person's face is reduced and the width of the region depicting the face is increased.

Rotation 520 may then be applied to the flattened RGB image so that at least some of the surfaces depicted in the flattened image are approximately fronto-parallel to a view point of a camera used to capture the RGB image. In another example the flattened RGB image is rotated so that one or more of the estimated surfaces are approximately orthogonal to an axis of a capture device used to capture the image. Any perspective effects that are introduced by this rotation are stored in the distortion map. An image completion process is then applied 522 to the flattened, rotated RGB image in a manner guided by the distortion map. The completed RGB image may then be mapped back 524 to the surface defined by the depth map resulting in a completed image of high quality.

In some examples the scene geometry comprises only planar surfaces or at least some regions comprising mainly planar surfaces. In this case it is possible to reduce the amount of processing required at the warping stage as now described with reference to FIG. 6. Scene geometry is estimated 606 as described above with reference to FIG. 5 and using one or more of user input 600, the RGB image 602 and a depth map 604 corresponding to the RGB image. The image completion system is arranged to determine whether the whole scene or at least parts of the scene may be modeled using planes only. That is, regions of the estimated scene geometry which comprise planar surfaces only are determined. For other regions processing proceeds as from step 504 of FIG. 5. Where the geometry comprises planar surfaces only processing at the warping stage is reduced by omitting flattening. For the image regions with only planar surfaces the RGB image is rotated to be fronto-parallel to a viewpoint of an image capture device (which may be notional) used to obtain the RGB image. A distortion map is created 612 and used to store values related to perspective effects introduced by the rotation. Image completion is applied 614 to the rotated RGB image (or image regions) using the distortion map to guide the image completion process. The rotation is then reversed 618 on the completed RGB image to give a completed image as output 620.

Figure 7:
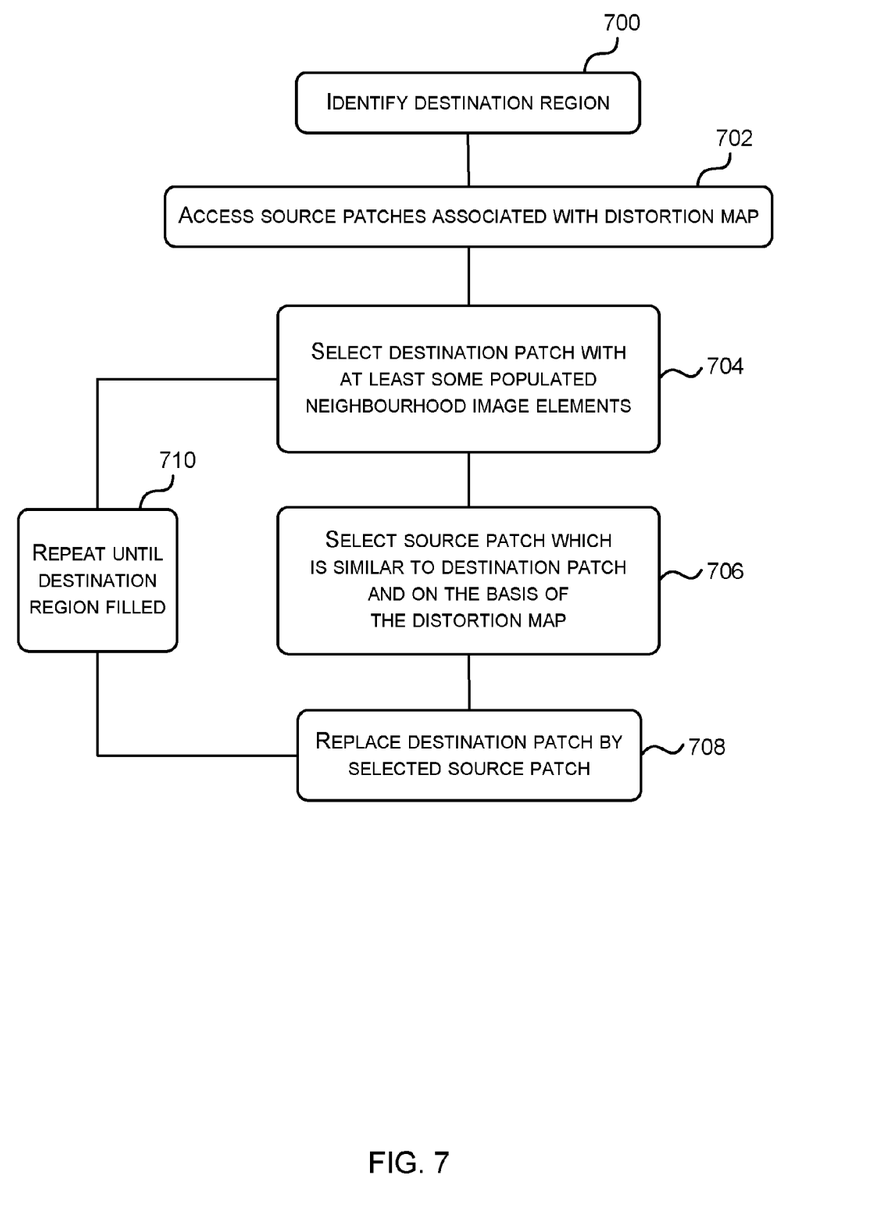
FIG. 7 is a flow diagram of a patch-based method of image completion.

FIG. 7 is a flow diagram of an example patch-based image completion process. A destination region is identified 700 which is the region to be completed in the image. As mentioned above this region does not need to be contiguous. The patch-based image completion process is arranged to fill the destination region by placing source image patches into the region to gradually fill it. A plurality of source image patches is available to fill the region and these are accessed 702. The source image patches may be obtained from the image itself, from a dictionary of image patches, from other images in a sequence of images (such as where the image is part of a video sequence), or other sources. Each source image patch is a group of image elements which has distortion information associated with it. For example, where the source image patches are taken from the image to be completed (e.g. where the foreground is to be completed the source patches may be taken from the background) each of the source image patches will have associated values in the distortion map.

The destination region can be thought of as comprising many destination patches which together cover the destination region. Each destination patch is a group of image elements where at least some of those image elements are to be completed. The method may comprise selecting a destination patch 704 which has at least some populated image elements. For example, the destination patch may be at the edge of the destination region. A source patch is selected 706 which is similar to the destination patch (using a similarity measure) and also on the basis of the distortion information associated with the source patches. For example, a source patch with low distortion is chosen which is similar to the destination patch. Any suitable similarity measure may be used. A non-exhaustive list of examples is: a Euclidean distance between vectors representing intensity values of the patches; a city block distance between vectors representing the intensity values of the patches.

In the case where the source patches are taken from the image itself the distortion map is used to guide the search for which source patch to select. For example, source patches with low distortion are preferred. A weighted combination of the similarity measure and the distortion information may be used to select the source patch. In other examples, the source patches are filtered using the distortion information and then a source patch is selected using the similarity measure.

The destination patch is replaced by the selected source patch 708. Replacing may comprise deleting the destination patch and inserting the selected source patch. It may also comprise overwriting the destination patch by the selected source patch.

The quality of the results depends at least in part on the quality of the source image patches and also on the method used to select which of the source image patches to use at each destination patch. By using the distortion information to guide the selection improved quality results are obtained.

Figure 8:
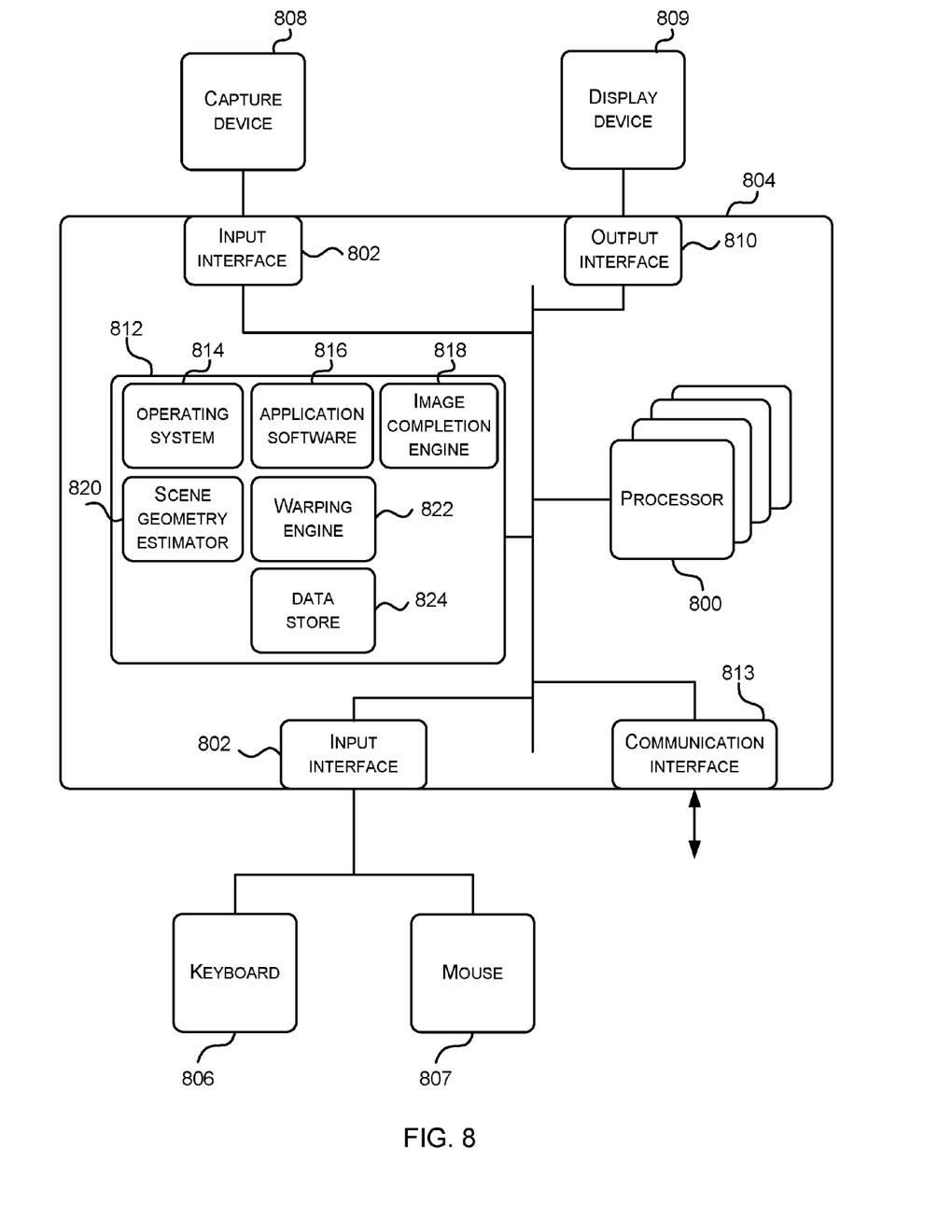
FIG. 8 is a schematic diagram of a computing device in which embodiments of an image completion system may be implemented.

FIG. 8 illustrates various components of an exemplary computing device 804 which may be implemented as any form of a computing and/or electronic device, and in which embodiments of an image completion system may be implemented.

The computing device 804 comprises one or more input interfaces 802. The input interface may be arranged to receive input from one or more capture devices 808 which may be video cameras, digital cameras, medical image equipment, depth cameras, stereo cameras or other image capture devices. The input interface 802 may also be arranged to receive input from user input devices such as a keyboard 806 and mouse 807.

Computing-based device 804 comprises one or more processors 800 which may be microprocessors, controllers, graphics processing units, parallel computing units or any other suitable type of processors for processing computer executable instructions to control the operation of the device in order to carry out image completion. In some examples, for example where a system on a chip architecture is used, the processors 804 may include one or more fixed function blocks (also referred to as accelerators) which implement a part of the method of image completion in hardware (rather than software or firmware).

The computer executable instructions may be provided using any computer-readable media that is accessible by computing device 804. Computer-readable media may include, for example, computer storage media such as memory 812 and communications media. Computer storage media, such as memory 812, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Although the computer storage media (memory 812) is shown within the computing device 804 it will be appreciated that the storage may be distributed or located remotely and accessed via a network or other communication link (e.g. using communication interface 813).

Platform software comprising an operating system 814 or any other suitable platform software may be provided at the computing device to enable application software 816 to be executed on the device. An image completion engine 818 is also provided for example to carry out the image completion processes described herein. A scene geometry estimator 802 is provided to enable geometry of a scene to be estimated as described herein and a warping engine 822 is provided to rotate and or flatten images as described herein. A data store 824 is able to store images, parameters and weights for use in the image completion process, dictionaries of source patches, distortion maps, completed images, and any other data associated with the methods described herein.

An output interface 809 is provided such as an audio and/or video output to a display system integral with or in communication with the computing-based device. The display system may provide a graphical user interface, or other user interface of any suitable type although this is not essential. In cases where the display system comprises a touch sensitive display the output interface may also act as an input interface. The output interface 809 may also output data to printing devices and other equipment.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory etc and do not include propagated signals. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A computer-implemented method comprising:
   receiving an image having at least one region to be completed;
   estimating geometry of a scene depicted in the image;
   warping the image using the estimated geometry such that one or more surfaces depicted in the image are approximately fronto-parallel to a view point of a capture device used to capture the image, warping the image including flattening the image by scaling geodesic distances computed between pairs of image elements of the image and rotating the flattened image such that at least some of the surfaces depicted in the flattened image are approximately fronto-parallel to the view point;
   completing the at least one region in the warped image by using source image patches selected at least on the basis of distortion introduced by the warping process.

2. A method as claimed in claim 1 wherein estimating the geometry of the scene comprises identifying surfaces of one or more objects depicted in the image.

3. A method as claimed in claim 1 wherein estimating the geometry of the scene comprises receiving a depth map of the same scene depicted in the image and identifying surfaces of one or more objects depicted in the scene from the depth map.

4. A method as claimed in claim 1 wherein receiving the image comprises receiving a stereo image pair depicting the scene and estimating the geometry of the scene by using the stereo image pair to identify surfaces of one or more objects depicted in the scene.

5. A method as claimed in claim 1 comprising determining whether at least part of the estimated geometry of the scene comprises only planar surfaces and if so, warping the image by rotating the image so that one or more of the surfaces are approximately fronto-parallel to a view point of the capture device.

6. A method as claimed in claim 1 wherein warping the image comprises carrying out perspective correction of the image using the estimate scene geometry.

7. A method as claimed in claim 1 which comprises creating a distortion map corresponding to the image and storing at each image element location of the distortion map a value related to an amount of distortion applied to that image element by the warping.

8. A method as claimed in claim 7 comprising selecting source patches on the basis of the distortion map.

9. A method as claimed in claim 1 comprising warping the completed image back.

10. A computer-implemented method comprising:
    receiving an image having at least one region to be completed;
    estimating surfaces of one or more objects depicted in the image;
    distorting the image such that one or more of the estimated surfaces are approximately orthogonal to an axis of a capture device used to capture the image, distorting the image including flattening the image by scaling geodesic distances computed between pairs of image elements of the image and rotating the flattened image such that at least some of the surfaces depicted in the flattened image are approximately orthogonal to an axis of a capture device used to capture the image;
    completing the at least one region in the distorted image by using source image patches selected at least on the basis of the distortion.

11. A method as claimed in claim 10 comprising receiving a depth map of the same scene depicted in the image and estimating the surfaces from the depth map.

12. A method as claimed in claim 10 comprising distorting the image by scaling geodesic distances computed between pairs of image elements of the image.

13. A method as claimed in claim 10 comprising distorting the image by rotating the image.

14. A method as claimed in claim 10 comprising determining whether the estimated surfaces are planar and if so, distorting the image by rotating the image so that one or more of the surfaces are approximately orthogonal to an axis of the capture device.

15. An image completion system comprising:
    an input arranged to receive an image having at least one region to be completed;
    a geometry estimator arranged to estimate surfaces of a scene depicted in the image;
    a warping engine arranged to warp the image by flattening the image by scaling geodesic distances computed between pairs of image elements of the image and also by rotating the flattened image such that at least some of the surfaces depicted in the image are approximately fronto-parallel to a view point of a capture device used to capture the image;
    an image completion engine arranged to complete the at least one region in the warped image by using source image patches selected at least on the basis of distortion introduced by the warping process.

16. An image completion system as claimed in claim 15 wherein the warping engine is arranged to create a distortion map corresponding to the image and to store at each image element location of the distortion map a value related to an amount of distortion applied to that image element by the warping.

17. An image completion system as claimed in claim 15 wherein the image completion engine is arranged to select source patches on the basis of the distortion map.

18. An image completion system as claimed in claim 15 wherein the warping engine is arranged to warp the completed image back.

* * * * *